Nov. 18, 1930.                E. L. VICARS                1,782,327
                    BISCUIT MAKING AND THE LIKE MACHINE
                      Filed Dec. 11, 1925        3 Sheets-Sheet 1
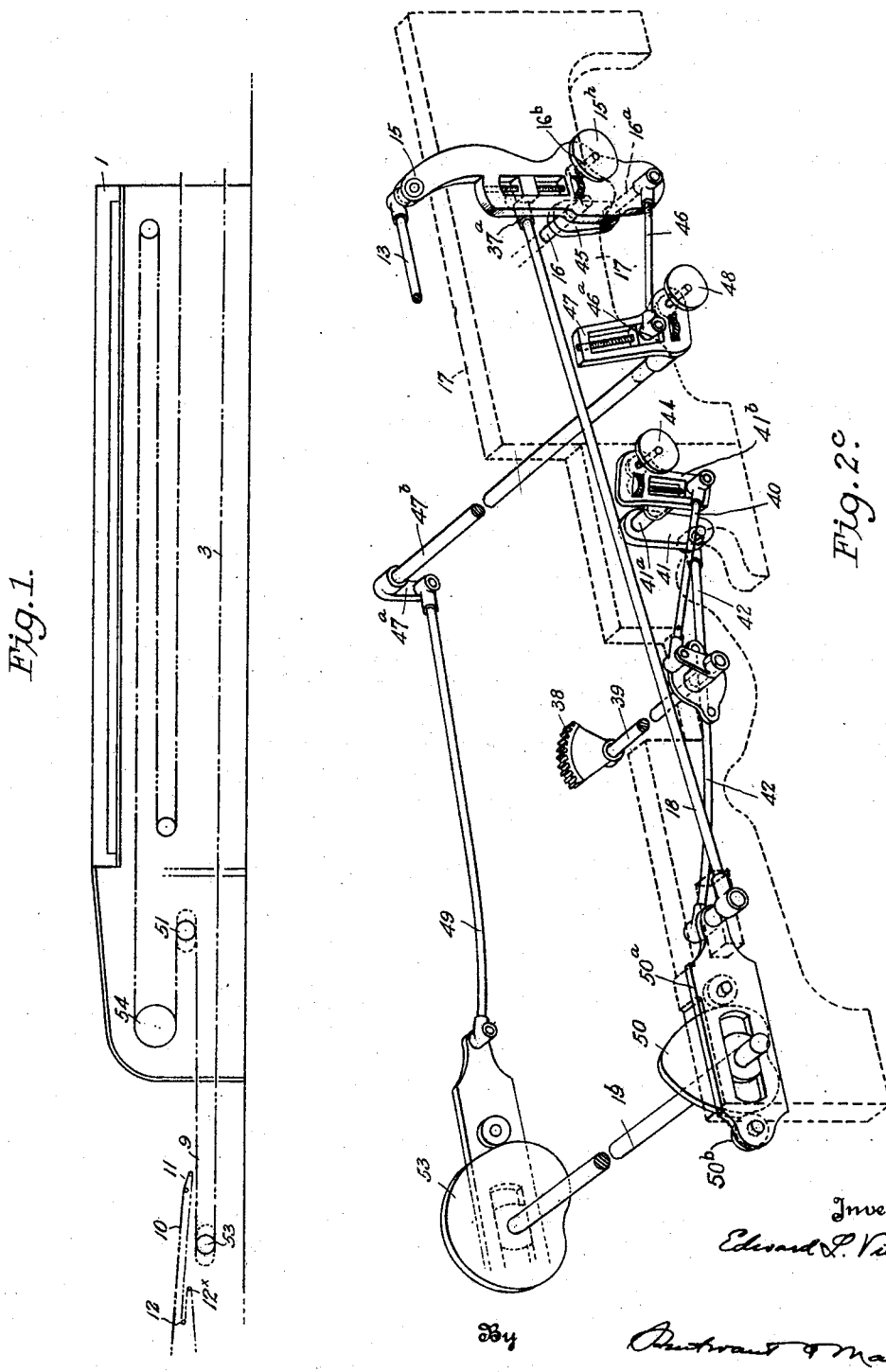

Nov. 18, 1930.   E. L. VICARS   1,782,327
BISCUIT MAKING AND THE LIKE MACHINE
Filed Dec. 11, 1925   3 Sheets-Sheet 2
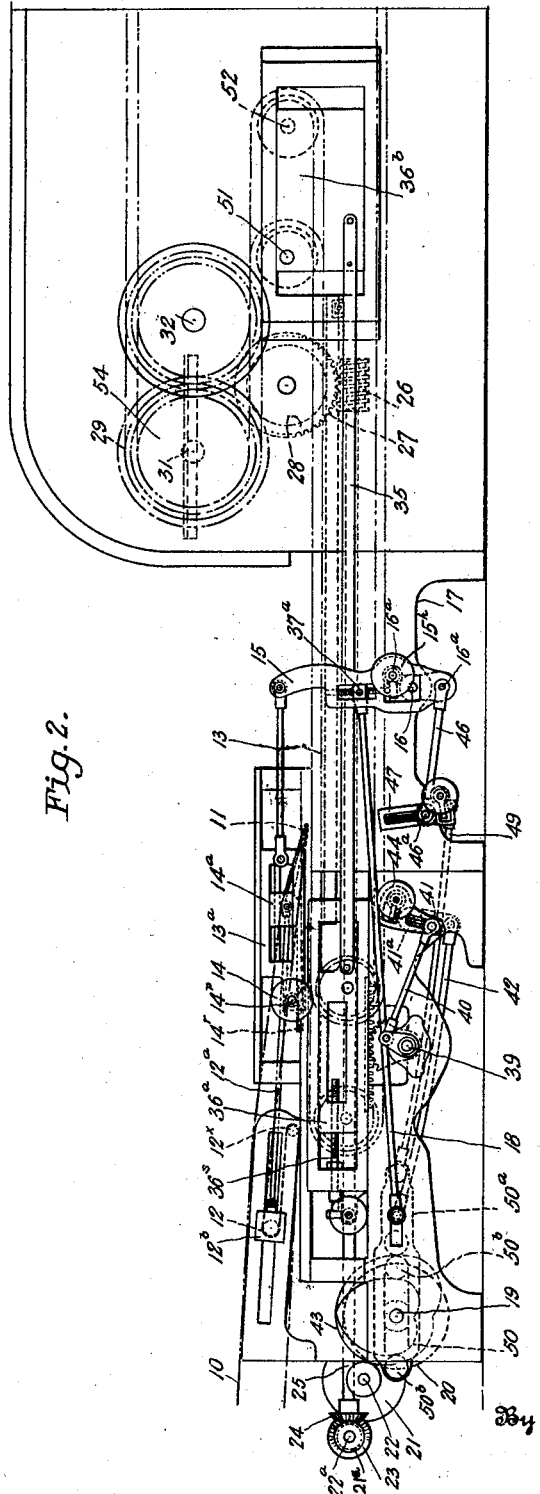
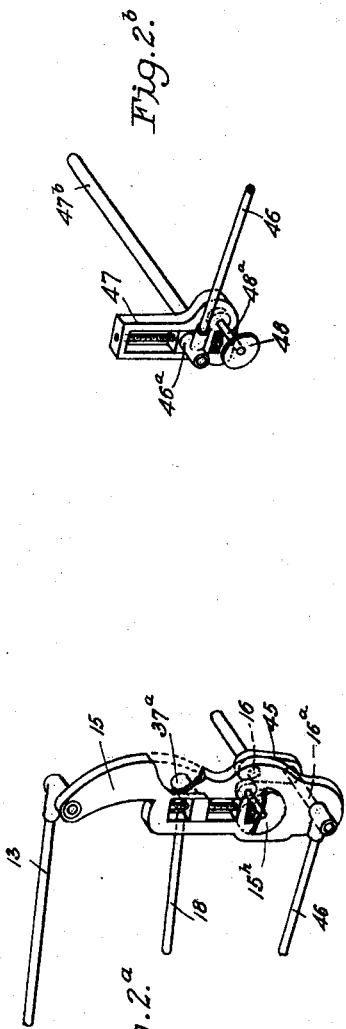
Inventor
Edward L. Vicars
By
Stewart & Mason
Attorneys.

Nov. 18, 1930.  E. L. VICARS  1,782,327

BISCUIT MAKING AND THE LIKE MACHINE

Filed Dec. 11, 1925    3 Sheets-Sheet 3

Inventor.
Edward Lynton Vicars
By Hunter and Ausorn
attorneys

Patented Nov. 18, 1930

1,782,327

UNITED STATES PATENT OFFICE

EDWARD LYNTON VICARS, OF EARLESTOWN, ENGLAND, ASSIGNOR TO T. & T. VICARS LIMITED, OF EARLESTOWN, ENGLAND

BISCUIT-MAKING AND THE LIKE MACHINE

Application filed December 11, 1925, Serial No. 74,725, and in Great Britain December 17, 1924.

The present invention relates to an improved conveying arrangement or the like conveying machinery and more particularly to delivering pieces of cut dough biscuits upon a conveyor for conveying biscuits through an oven, of the type in which horizontally disposed trays form part of or are carried by a conveyor through horizontal and vertical flights or traverses of the oven.

According to the present invention pieces of cut dough biscuits are transferred to the conveyor for conveying these through the oven by mechanical means.

In one form of the invention the knife edge or bight of a belt forming the conveyor on which the dough pieces are carried to the oven conveyor moves in its skipping action over and in a horizontal plane parallel with the tray.

The invention is more particularly described with reference to the accompanying drawings, in which:—

Figure 1 is a diagrammatic view of a biscuit baking oven and feeding means therefor.

Figure 2 is a side elevation on an enlarged scale of the mechanism at the feeding end of an oven.

Figure 3:
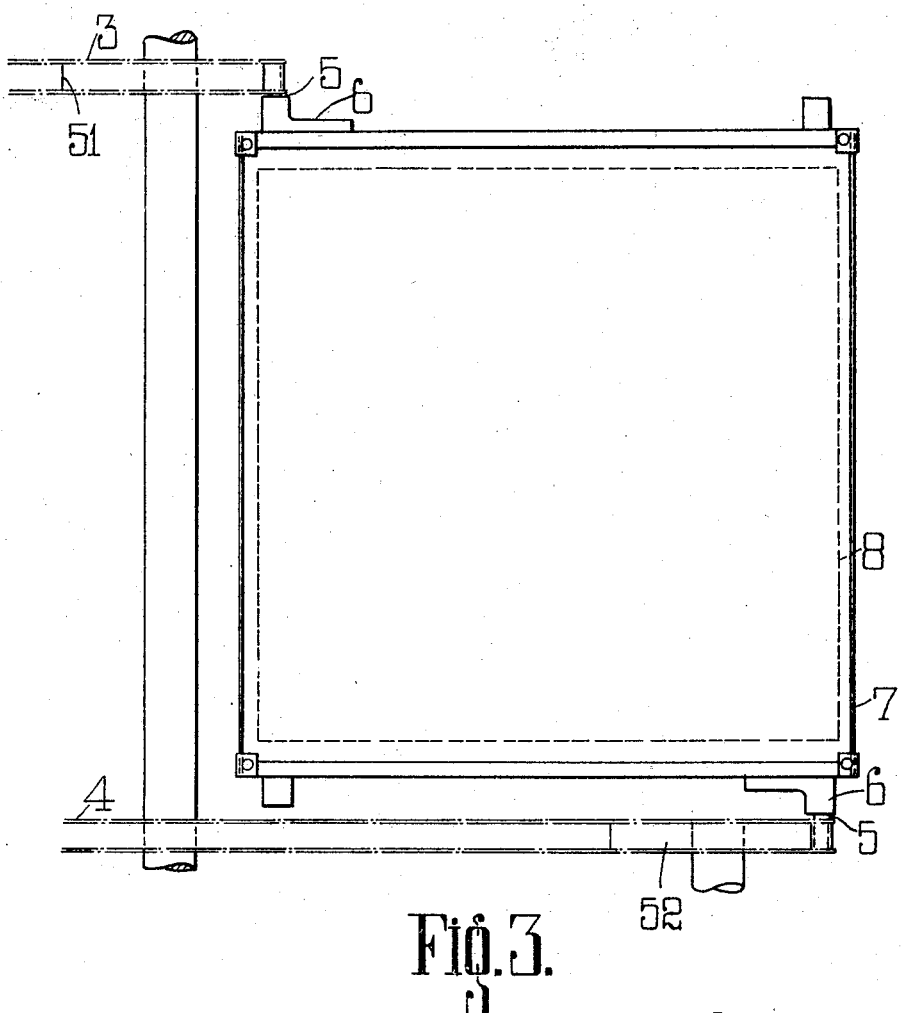

Fig. 2ª is a perspective view of the link 15 and connected parts, the shafts and pivots being shown as extended for greater clearness.

Fig. 2ᵇ is a similar perspective view of the rocking link 47.

Fig. 2ᶜ is a general perspective view of the cam system, rocking links, and adjusting members.

Figure 3 is a detail view showing the method of mounting the individual trays of the conveyor.

The oven 1 which may be separate from or combined with a cooling chamber has a continuous conveyor passing through it, comprising a pair of chains 3, 4, the sprockets 51, 52 of which at the end of any traverse are slightly displaced from one another as shown in Figure 3. The pivotal pins of the links of these chains at spaced intervals form sockets for the reception of a pivotal pin 5 on a bracket 6 at diagonal corners of a frame 7, adapted to hold a detachable tray 8, or again the frame may be integral with the tray.

It will consequently be seen that owing to the displacement of the sprockets guiding the chains 3, 4 and the peculiar arrangement of the pivotal support for the tray or oven plates 7, and by the provision of pins or lugs engaging with fixed guides on the machine, the trays will be maintained permanently horizontal irrespective of whether they are proceeding along a horizontal flight or turning from or into a vertical flight, or proceeding in such vertical flight.

According to the present invention automatic means are provided for depositing in spaced relationship rows of cut or moulded dough biscuits upon such trays, and this may be effected, whilst for instance, they are passing in a horizontal flight, such as indicated at 9, Figure 1, which flight may extend outside the oven and beneath a feeding conveyor 10. This conveyor 10 may therefore, serve the purpose of depositing spaced rows of biscuits on the oven plate or tray of the conveyor, whilst this is in motion, and further may compensate for the gaps between one tray and the next in sequence.

The main driving shaft 22ª of the machine acts through spur gearing 20, 21 and 21ª to drive the shaft 19, and this shaft 22ª also acts through bevel gearing 23 and 24 to drive a shaft 25 with a worm 26 thereon in mesh with a worm wheel 27 driving a pinion 28 on the same shaft, the latter being in mesh with pinions 29, 30 on the spindles 31, 32 of the sprocket wheels 54, 56 for the chain conveyor 3, 4. This chain conveyor is thereby driven at a constant rate of speed through the machine. The conveyor chains 3, 4 also pass over the sprocket wheels 51, 52 and 53, 55, which are connected together for movement by the connecting rod 35.

It will be noted that by this connection of the sprockets, a pan connected to the chain 3, 4 is caused to remain relatively stationary or to move much slower than the constant speed of the chain, during the time when the traveler members 36ª, 36ᵇ are moving toward the left in the figure; and on the contrary, to move at an accelerated rate of speed when these carrier members are moving toward the right in the figure.

One arrangement for controlling and effecting the feeding operation is shown in Fig. 2. The conveyor 10 carrying the cut or molded dough biscuits passes around the edge of the placing knife 11, over pulley 12 and back to pulley $12^x$, and then back on the return flight. The knife 11 is mounted on a block $14^a$ carried by the sliding frame $13^a$. The position of the block $14^a$ is regulated with respect to the sliding member $13^a$ by a hand wheel 14 having a pinion engaging a rack $14^r$ fixed to the block $14^a$. This block $14^a$ likewise has a rod $12^a$ secured to the bearing blocks $12^b$ for the guide pulley 12. The block $14^a$, the knife 11 and the guide pulley 12 therefore move together at all times. The cam 50 on shaft 19 drives a frame $50^a$ having the cam engaging rollers $50^b$ thereon and reciprocates the two rods 18 and 42. The rod 18 is connected to a block $37^a$ which is adjustable in a slot of the lever 15 to act upon this lever at variable distances from the pivotal point, so that with a given movement at the periphery of the cam, the end of the lever 15 is caused to move by different distances, this lever 15 acting through its connecting rod 13 to move the sliding member $13^a$ and therewith the block $14^a$ and associated parts. The position of the sliding block $37^a$ and therewith the fulcrum point of the rod 18 upon the lever is varied by a hand wheel $15^h$ having a shaft $16^b$, in any desired manner. (See Fig. $2^a$.)

The motion of the lever 15 is a compound one comprising the movement caused by the rod 18 as set forth above, and also a movement derived from a rod 49 actuated by a roller engaging the cam 43 on shaft 19. The other end of this rod 49 is connected to a link 47 oscillatable about a pivot and having a slot in its upper end to receive the head $46^a$ of a thrust rod 46 which is connected to the lower end of the lever 15 at pivot $16^a$ (see Fig. $2^a$). By the adjustment of the position of the head $46^a$ on the slot or lever 47 by means of a hand wheel 48 on its shaft $48^a$ (see Fig. $2^b$), the length of stroke of the rod 46 may be varied as desired. The lever 15 itself is pivotally mounted on a short link 45 carried on a pivot 16 of the framework of the machine.

The rod 42 is pivotally connected to frame $50^a$ and to a crank lever 41 mounted on a fixed pivot $41^a$. A second lever $41^b$ at its lower end is pivoted to a connecting rod 40 which acts upon a crank on the shaft 39 whereby to drive a toothed segment 38 which acts upon a rack $36^r$ carried by the sliding block $36^a$. The upper end of the lever $41^b$ is provided with a slot so that the relative length of the lever $41^b$ may be adjusted by a hand wheel 44, whereby to vary the throw of the connecting rod 40.

The sliding block 36 has the traveler member $36^a$ therein capable of adjustment with regard to the sliding block 36 itself, by an adjusting screw $36^s$. The sliding block 36 also has a connecting rod 35 running in the direction of length of the machine and fastened to a second traveling block $36^b$ likewise guided in the machine frame. The respective blocks carry the guide sprockets 53, 55 and 51, 52 for the conveyor chains.

Consequently, it will be seen that an accelerated motion is given to that part of the conveyor in the horizontal flight which has the pan upon which the dough biscuits are then being placed, quite irrespective of the average motion of a conveyor within the oven. The purpose of this accelerated motion is to allow the oven conveyor to move forward the distance between successive pans during the time in which the bight or knife 11 of the conveyor 10 is moving forward after having delivered a pan full of biscuits upon the oven conveyor. The next pan full of biscuits will then be delivered by the conveyor 10 on the next pan in spaced rows, and it is thereby insured that biscuits will not be laid over or between the gap between successive pans on the conveyor 3, 4. The adjustment for this purpose is accomplished by the hand wheel 44 which adjusts the throw of the connecting rod 40 and therewith the movement of the traveler members $36^a$, $36^b$.

Under the actuation of the lever 15 by the connecting rod 18, the knife 11 and the guide roller 12 are caused to reciprocate in timed relationship to the other movements of the mechanism. As the knife 11 moves in one direction, the transverse rows of biscuits are deposited in spaced relationship upon the pan therebeneath; while during its movement in the other direction, it travels at a speed corresponding to that of the belt 10 itself, so that biscuits upon the conveyor 10 are temporarily prevented from moving down onto a pan until the knife 11 has completed this movement.

The length of stroke of the knife 11 is adjusted by the movement of a head $37^a$ of the connecting rod 18 and also by the adjustment of the throw of the rod 46. This latter adjustment provides for an effective control of the delivery of the biscuits when it is desired to lay the biscuits from the conveyor 10 upon the pans, when the biscuits have been cut or molded in staggered or overlapping relationship to one another, and thus assured at the end of the relative placing movement of the knife 11, when the traveling member $36^a$, $36^b$ comes to move to space the pans, following a completion of the filling of one pan and in order to bring the next pan into position for filling, the row of biscuits will not be lying half on and half off the bight of the conveyor at the edge of the knife 11.

It will particularly be noted from Figs. 2ª and 2ᶜ that the operation of the main shaft 19 with the corresponding rotation of the cam 50 leads to a reciprocating movement of the frame 50ª and therewith a rocking of the links 18 and 42. The link 42 causes a rocking of the crank lever 41 about its pivot 41ª, and therewith a driving of the rock lever 41 and with this of the actuator link 40 so that finally the toothed segment 38 causes a backward and forward movement of the frame 36ª and therewith of the frame 36ᵇ so that the oven belts 3, 4 and their portions 9 are given a forward and backward movement for the purpose of operating the pans at successively differing rates of speed for the purposes set forth above. This movement is regulated by adjusting the point of engagement of the link 40 with the lever 41 by the hand wheel 44. The link 18 is connected by its head 37ª to the rock lever 15 and the latter by link 13 to the oscillating block 14ª and thus moves the guiding knife edge 11 and its associated parts. The distance of this movement is adjusted by the movement of the head 37ª upward and downward in the slot of the lever 15 by the hand wheel 15ʰ. The lever 15 is pivoted on shaft 16ª of the crank arm 45 which in turn is mounted by the pivot 16 on the frame 17 so that the lever 15 has a further freedom of movement. The cam 43 on shaft 19 operates through the link 49 to cause a rocking of the crank arm 47ª and its shaft 47ᵇ and therewith of rock lever 47 and thus of the link 46 to occasion and control the movement of the rock lever 15 as permitted by the crank arm 45. The lever 47 has a slot to receive the pin 46ª of the link 46, and the stroke of this link 46 is determined by the position of the pin 46ª in the slot, being adjusted suitably by the hand wheel 48.

In operation, assuming that the feeding knife edge 11 of the feeding conveyor 10 is at the right hand limit of travel and a pan is located beneath this feeding conveyor, then the common source of power acts through the shaft 19 and its cams 43, 50 to cause (1) a movement of the link 42 so that the rock lever 41 and link 40 cause a movement of the segment 38 and thus a relative retardation of the movement of the portion 9 of the oven conveyor and the pan thereon; (2) the link 18 operates upon the rock lever 15 to cause a movement of the knife edge 11 toward the left, the feeding conveyor 10 being drawn around this edge as the guide roller 12 of the same likewise moves toward the left. The biscuits upon the feeding conveyor 10 are thus deposited, row by row, upon the pan which has had its relative movement temporarily suspended. The cam 43 also operates through the link 49 to control the movement of the rock lever 15, so that by an adjustment of the reciprocation of the link 46 by the position of the pin 46ª in the slot of rock lever 47, the spacing of the rows of biscuit upon the pan may be controlled.

When the knife edge 11 has reached its extreme left hand position, the pan has been filled with biscuit in the proper order and arrangement.

The continued rotation of the shaft 19 now causes the return movement of the several links 18, 42, 49, resulting in a momentary acceleration of movement of the portion 9 of the oven conveyor and the pan thereon whereby a new pan is quickly brought into position for charging; and at the same time the knife edge 11 is returned to its right hand position at such a speed that the feeding conveyor 10 does not move around the knife edge 11 and the feeding of further biscuit is suspended during this portion of the cycle of operation. As soon as the next pan has been presented in the position originally occupied by the aforementioned first pan, the parts then act again to relatively delay or retard the movement of this second pan and to cause a movement of the feeding knife edge 11 toward the left so that this second pan is charged. This operation continues for the successive pans.

I declare that what I claim is:—

1. A biscuit making machine comprising an oven, an endless oven conveyor moving at a uniform rate of speed through the oven, three sets of guide wheels over which the conveyor runs at the feeding end whereby it is given a first reversal of direction at the first set, a second reversal at the second set and a third reversal at the third set, means to couple said first and second sets to move together in a direction parallel to the flight of the conveyor between them, a stationary bearing for the third set, a rotating shaft, and means operated by said shaft to move said first and second sets whereby to produce alternately apparently decreased and increased movements of the flight of conveyor between them, and including a cam, a lever, a link operated from said cam and pivotally connected to said lever to move the same, a device connected to said coupling means and including an actuator link pivotally connected to said lever for moving said first and second sets, and means provided on said lever to vary the point of pivoting of said actuator link thereon whereby to change the distance of movement of said first and second sets.

2. A biscuit making machine comprising an oven, an endless oven conveyor moving at a uniform rate of speed through the oven, three sets of guide wheels over which the conveyor runs at the feeding end whereby it is given a first reversal of direction at the first set, a second reversal at the second set and a third reversal at the third set, means to couple said first and second sets to move together in a direction parallel to the flight of the conveyor between them, a stationary bearing for the third set, a rotating shaft, a cam on said shaft, a rack connected to said means, a toothed segment engaging said rack, a link operated from said cam and connected to rock said segment whereby to move said first and second sets parallel to the direction of flight of the conveyor between them, a second cam on said shaft, a feeding conveyor, a knife edge over which said feeding conveyor runs whereby to discharge biscuits thereon upon said oven conveyor, a rock lever and means connecting said rock lever to the knife, and means operated by both of said cams to move said rock lever.

3. A biscuit making machine comprising an oven, an endless oven conveyor, a common source of power and means operated by said source to move said oven conveyor at a uniform rate of speed through the oven, means including a plurality of relatively movable guiding wheels over which the oven conveyor runs whereby a portion of the oven conveyor may be caused to have alternately apparently decreased and increased movements relative to the frame, a cam driven from said common source of power, means operated by said cam and connected to at least one of said guiding wheels whereby to produce the relatively decreased and increased movements of the said portion of the oven conveyor, a feeding conveyor having a feeding knife edge over which biscuits may be delivered to said oven conveyor, and means operated by said cam to vary the position of said feeding edge with respect to said oven conveyor in coordination with the movement of said guide wheel.

4. A biscuit making machine as in claim 3, in which said cam operated means include rock levers, independent links pivotally connected to the rock levers to be reciprocated thereby, and means to change the pivot points of said links with respect to said rock levers.

5. A biscuit making machine as in claim 3, including a second cam driven from said common source of power, and means operated by said second cam to cooperate with said second means to vary the position of said feeding edge.

6. A machine as in claim 3, including a second cam driven from said common source of power, a rock lever, and first and second links operated by said cams independently of one another to rock said rock lever, and means connecting said rock lever to said feeding edge.

7. A biscuit making machine comprising an oven, an endless conveyor, a source of power, means to drive said oven conveyor from said source of power, first and second cams rotated by said source of power, a first rock lever and a link pivoted thereto reciprocated by said first cam, a device to relatively retard the speed of a portion of said oven conveyor and including a link pivoted to said rock lever, means to change the pivot point of said link on said rock lever whereby to vary the retardation, a feeding conveyor having a feeding knife edge, a second rock lever and a link pivotally connected therewith and connected to be reciprocated by said second cam, a pin, a third rock lever pivotally mounted on said pin, a crank arm pivoted to the frame and carrying said pin, a link pivotally connected to said second rock lever and to said third rock lever, a connection from said third rock lever to said feeding edge to move the same, and a link operated from said first cam and pivotally connected to said third rock lever whereby said first cam in rotation controls the relative retardation of said oven conveyor and said first and second cams conjointly control the movement of said feeding knife edge.

8. A biscuit making machine comprising an oven, an endless oven conveyor having a plurality of spaced pans thereon, a source of power, means to drive said oven conveyor from said source of power and including means to intermittently retard and accelerate the relative movement of a portion of said oven conveyor, a feeding conveyor, means to move the feeding edge of said feeding conveyor in one direction relative to said oven conveyor whereby to deposit biscuit from said feeding conveyor upon one of said pans while said pan is relatively retarded in its movement and thereafter to move the feeding edge of said feeding conveyor whereby to prevent the depositing of biscuit therefrom during a movement of said edge in the opposite direction, said means for relatively retarding and oscillating said oven conveyor operating during the return movement of said feeding edge to relatively increase the speed of said portion of the oven conveyor whereby to present another pan beneath said feeding conveyor, and means operated from said common source of power to coordinate the movements of said retarding and accelerating means and said feeding conveyor moving means.

In witness whereof, I have hereunto signed my name this 27th day of November, 1925.

EDWARD LYNTON VICARS.